(12) United States Patent
Parker et al.

(10) Patent No.: US 6,722,508 B2
(45) Date of Patent: Apr. 20, 2004

(54) REMOVABLE CARTRIDGE ASSEMBLY FOR FILTERING BI-DIRECTIONAL AXIAL FLOW AND RADIAL FLOW AND METHOD OF MAKING SAME

(75) Inventors: Kenneth J. Parker, Lake Orion, MI (US); Jorge A. Moreno, Auburn Hills, MI (US); Chuck Chang, Troy, MI (US); William J. Gorski, Jr., Romeo, MI (US)

(73) Assignee: Eaton Corporation, Cleveland, OH (US)

( * ) Notice: Subject to any disclaimer, the term of this patent is extended or adjusted under 35 U.S.C. 154(b) by 58 days.

(21) Appl. No.: 10/146,593

(22) Filed: May 15, 2002

(65) Prior Publication Data

US 2003/0213739 A1 Nov. 20, 2003

(51) Int. Cl.$^7$ ................................. B01D 35/02
(52) U.S. Cl. ................ 210/448; 210/450; 210/483; 210/485; 210/497.01; 210/497.2; 210/497.3; 210/499; 264/DIG. 48; 264/DIG. 70
(58) Field of Search ................ 210/448, 450, 210/483, 485, 497.01, 497.2, 497.3, 499; 264/DIG. 48, DIG. 70

(56) References Cited

U.S. PATENT DOCUMENTS 4,882,055 A * 11/1989 Stamstad ................ 210/497.2
5,252,204 A * 10/1993 Chiodo ........................ 210/499

* cited by examiner

Primary Examiner—David A. Reifsnyder
(74) Attorney, Agent, or Firm—Roger A. Johnston

(57) ABSTRACT

A one-piece filter cartridge is formed by inserting an open ended cylindrical screen and an end screen for the cylindrical screen in a mold and overmolding with engineered resinous material to form spaced annular and axial support ribs for the screen material. The cartridge is suitable for use in an hydraulic circuit for filtering bi-directional and radial flow without backwashing trapped particles from flow in one axial direction. One of the ribs has an annular groove for a seal ring for sealing about the cartridge upon insertion in a flow passage.

11 Claims, 5 Drawing Sheets

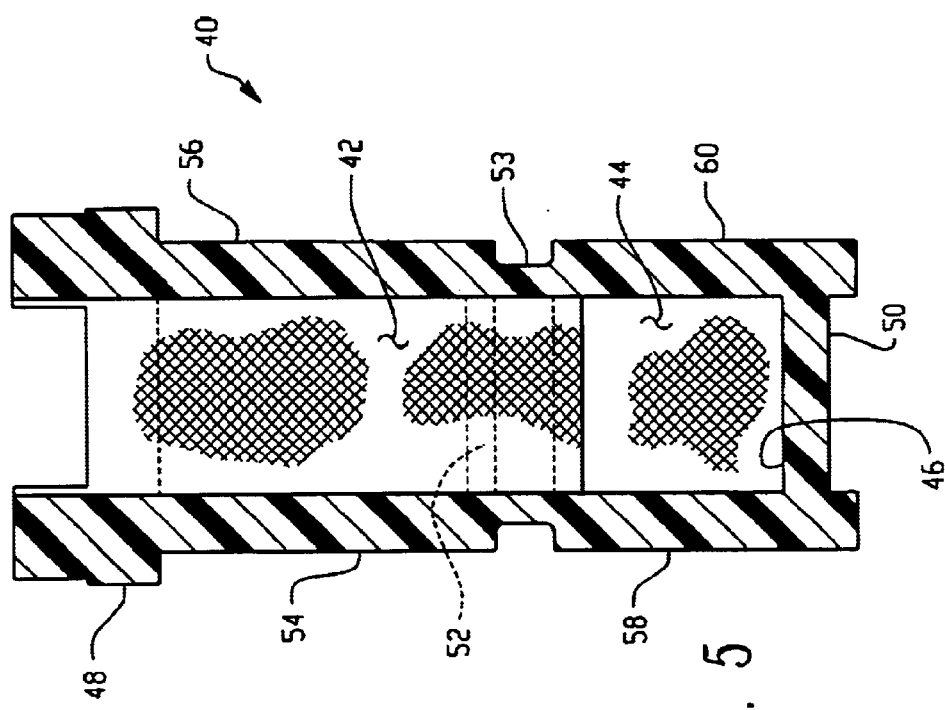
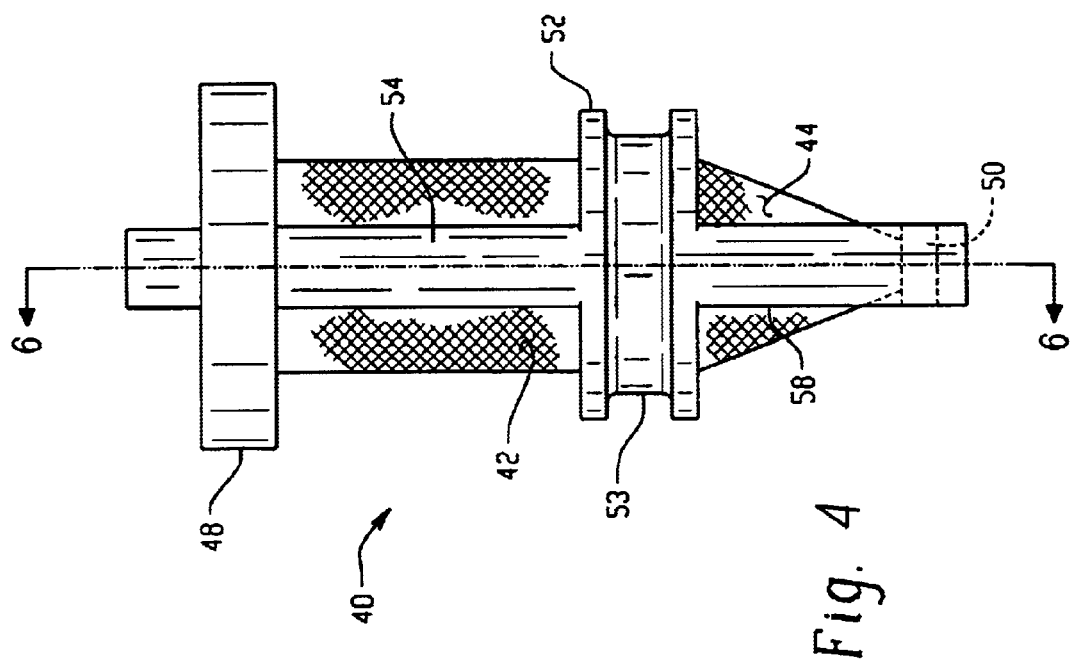

REMOVABLE CARTRIDGE ASSEMBLY FOR FILTERING BI-DIRECTIONAL AXIAL FLOW AND RADIAL FLOW AND METHOD OF MAKING SAME

BACKGROUND OF THE INVENTION

The present invention relates to particulate filters in fluid systems and particularly relates to fluid systems of the type utilizing hydraulic fluid or engine oil and more particularly relates to the flow of fluid in an hydraulic operating circuit of an internal combustion engine valve deactivation system.

In certain motor vehicle engine applications, it is desired to provide a filling access port into the valve deactivation hydraulic circuit for adding fluid in service and for sealing the service port after filling. The filling access port must be located conveniently for gravity filling and yet be sealed after filling to withstand the operating pressures and flow during operation of the engine. In order to provide a convenient location and proper access to the deactivation hydraulic circuit and accommodate gravity fluid filling, it has been necessary to locate the filling access port in such a manner as to experience reverse flow to a branch passage during operation with respect to the gravity flow during filling. Where it is desired to provide filtering of the fluid during filling and during engine operation, this port arrangement has complicated the use of a cartridge type filter for protecting the fluid in the circuit from contamination during filling and during engine operation.

Accordingly, where a fill port is provided into the engine valve deactivation hydraulic fluid circuit and where the fill port is sealed after filling through fill port by a removable plug, it has been desired to provide a filter in the fill port to prevent introduction into the transmission of any contaminants or foreign material which may be present into the fluid added and to provide filtering of reverse direction fluid flow during engine operation.

The problem is further complicated where the fill port taps into a flow passage in the fluid circuit to form a three-way junction. Such an arrangement provides for fluid fill by gravity into the engine oil sump through vertical branch of the passage. When the removable plug is inserted and sealed after completion of filling, reverse flow is encountered to the other branch, thus backwashing any foreign material or contaminant trapped by the filter during fluid filling. Accordingly, it has been desired to provide a simplified and low cost removable filter cartridge which could provide for bi-directional flow in the fill port and also provide for flow to a branch without permitting foreign particles or material trapped during filling from being backwashed into the operating circuit.

BRIEF SUMMARY OF THE INVENTION

The present invention provides a generally cylindrical filter cartridge assembly insertion into a fluid flow circuit such as for use in an engine valve deactivation hydraulic circuit. The cartridge is inserted in a fill port provided in the fluid circuit and is retained and sealed therein by removable plug after the addition of fluid to the system through the fill port. The cartridge provides for reverse axial flow therethrough during filling and reverse axial and radially outward flow to a branch circuit upon insertion of the removable plug after filling and prevents foreign material which may be trapped in the filter during filling from entering into the fluid circuit through the branch channel during engine operation. The filter is a one-piece removable cartridge which is insertable in the fill port and sealed therein.

The filter of the present invention has a generally cylindrical configuration and is preferably formed of screen material with one end open and a wall of screen material closing the opposite end of the cylindrical configuration. The screen material is overmolded with plastic or engineered resin material to form axially spaced annular support ribs with an annular seal provided thereabout for isolating the branch channel in the fluid circuit to permit reverse flow axially through the transverse screen and radially outward flow to the branch channel. In the presently preferred practice, the screen material is overmolded by injection molding with the screen material comprising a cylindrical piece and a flat disc shaped piece for the closed end in one embodiment and a tapered piece in another embodiment which pieces are inserted into a mold for overmolding for forming a one-piece filter cartridge. The present invention thus provides a novel removable filter cartridge for providing filtering during bi-directional axial flow and radial outflow with filtering and which is low in cost, relatively easy to manufacture and provides complete stiffening of the filtering material by overmolding with plastic stiffening ribs.

BRIEF DESCRIPTION OF THE DRAWINGS

FIG. 4 is a side view of another embodiment of the filter cartridge of the present invention;

FIG. 5 is a section view taken along section indicating lines 5—5 of FIG. 4; and, FIG. 6 is an axonometric view of the cartridge of FIG. 4.

DETAILED DESCRIPTION OF THE INVENTION

Figure 1:
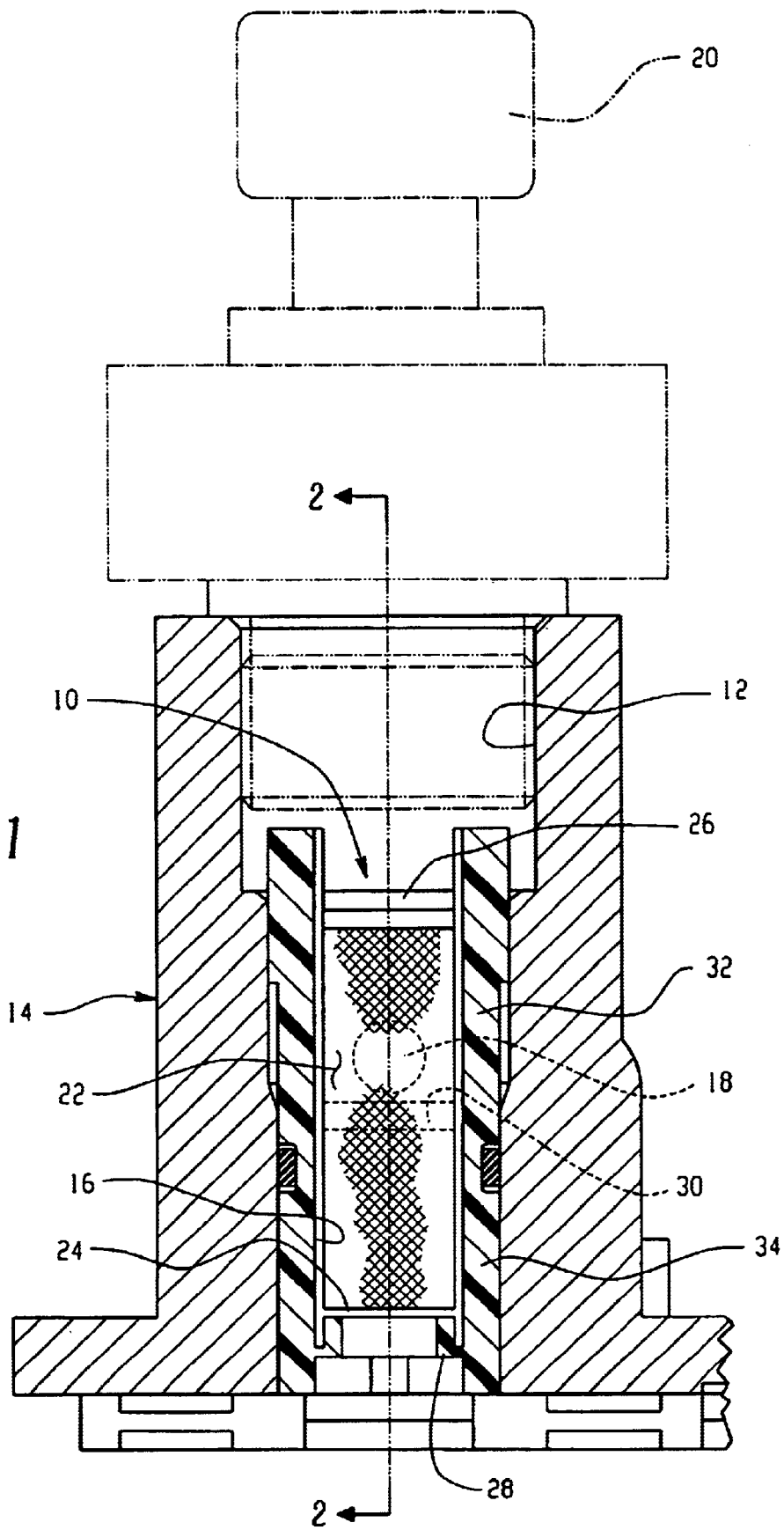
FIG. 1 is a cross-section taken through a portion of an engine valve deactivation hydraulic circuit having a fill port and communicating with a sump with a branch port and shows a removable access plug in dashed outline.
Figure 2:
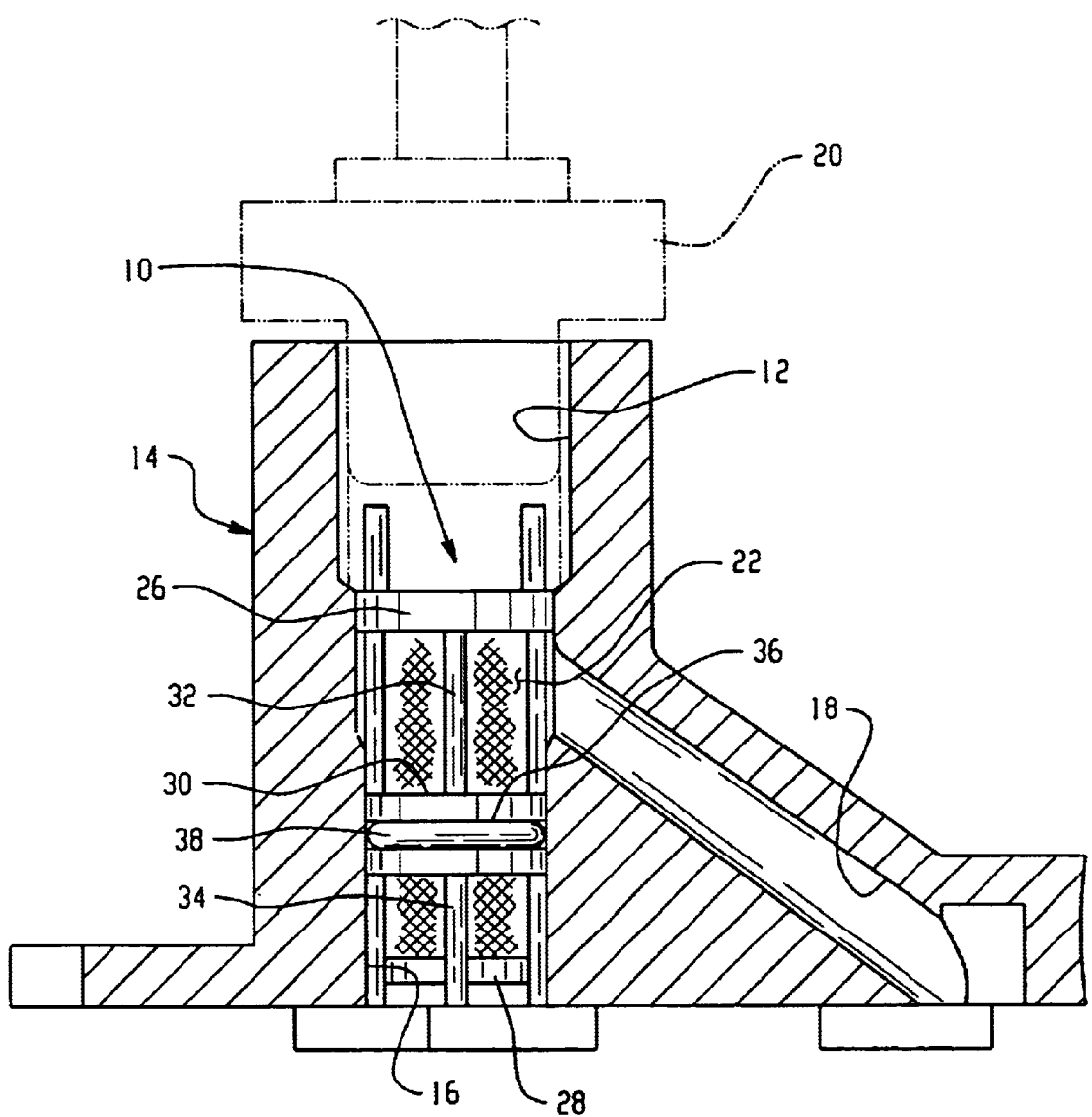
FIG. 2 is a section view taken along section indicating lines 2—2 of FIG. 1.
Figure 3:
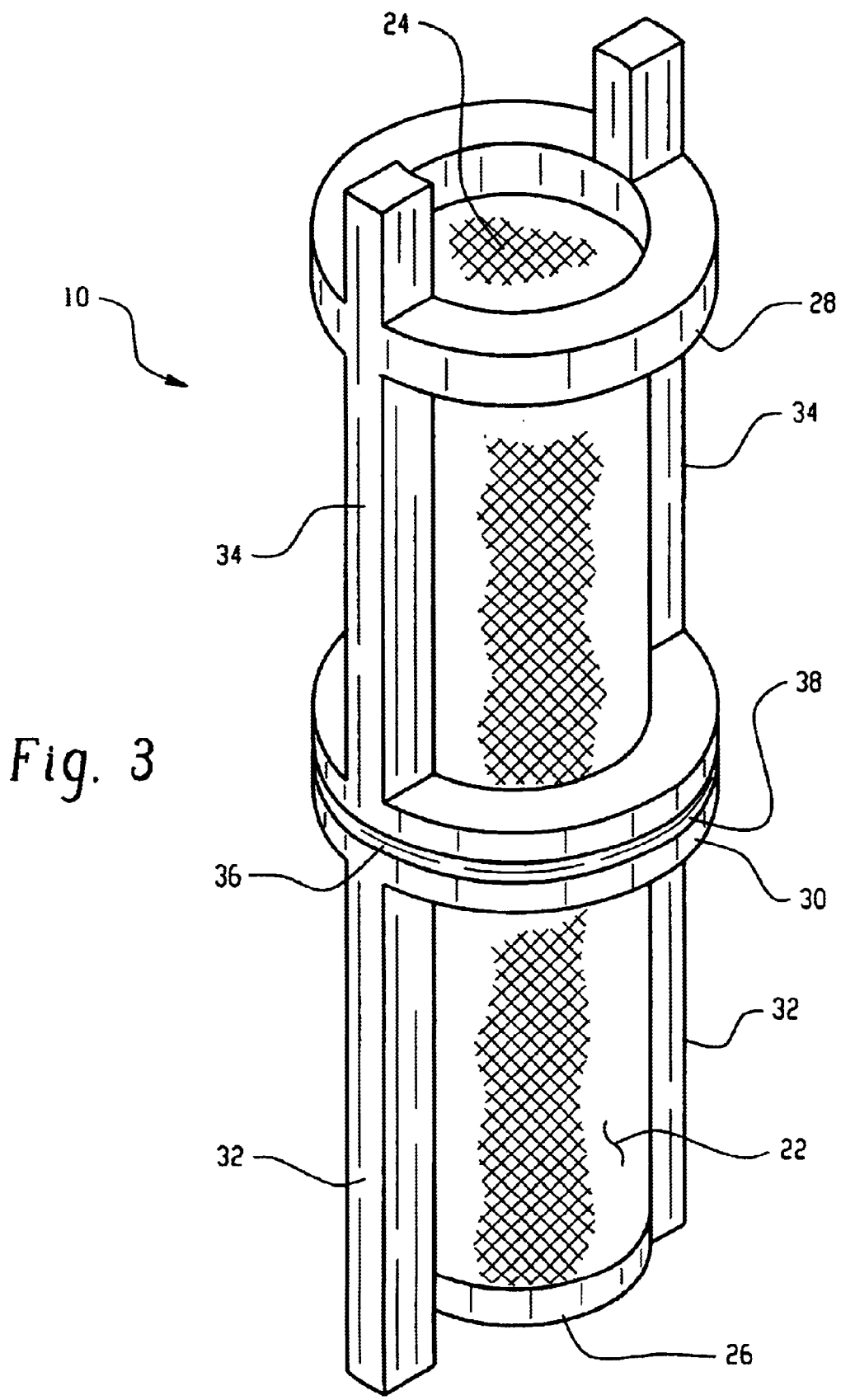
FIG. 3 is an isometric view of the cartridge assembly removed from the fill port.

Referring to FIGS. 1 through 3, the cartridge assembly of the present invention is indicated generally at 10 and is shown installed in a fill port 12 provided in a fluid circuit defining structure 14 which may be an engine valve deactivation circuit which has a fluid system communicating passage 16 which connects with the fill port 12 and a branch channel 18 communicating with passage 16. The filter assembly 10 is intended for operation where the system is filled through fill port 12 and then a plug 20 is installed to seal the port. During filling the filter assembly 10 filters out foreign particles from the fluid passing through the fill port and downwardly by gravity flow through the passage 16 and into the system (not shown) to be operated. The access plug 20 is then installed in passage 12 and the passage is sealed. Subsequently, the system operates to provide pressurized fluid through branch channel 18 radially through the filter assembly 10 and downwardly through the filter into passage 16 for discharge into the system.

Referring to FIGS. 1, 2 and 3, one embodiment of the invention is shown in which the filter 10 comprises a hollow cylindrical member 22 formed of porous material with one end open and the other end closed by a relatively thin transversely extending member 24 formed of similar porous material. In the presently preferred practice of the invention, the porous members 22, 24 comprise screens formed in woven or mesh configuration and preferably formed of stainless steel material; however, it will be understood that other materials may be employed which are compatible with the fluid to which the filter 10 is to be exposed.

Referring to FIGS. 2 and 3, the filter of assembly 10 has formed over the members 22, 24 an overmold with suitable material such as, for example, polyamide material fractionally filled with glass particles. The overmold includes an annular rib 26 formed adjacent the open end of the porous member 22 and a second annular rib formed over the opposite end of the member 22 adjacent the transverse member 24, the second annular rib being denoted by reference numeral 28.

A third annular rib 30 is formed spaced axially intermediate the ribs 26, 28 and is interconnected with the ribs 26, 28 by respectively axially extending circumferentially spaced stringers or ribs 32, 34.

The intermediate rib 30 has an annular groove 36 formed about the outer periphery thereof, which groove has received therein an o-ring for sealing between the periphery of the rib 30 and the interior of passage 16. The filter assembly 10 may thus be inserted into the passage 16 from the upper end thereof prior to filling; and, the sealing plug 20 installed after the assembly of the fluid circuit structure 14 as, for example, to an engine.

Figure 6:
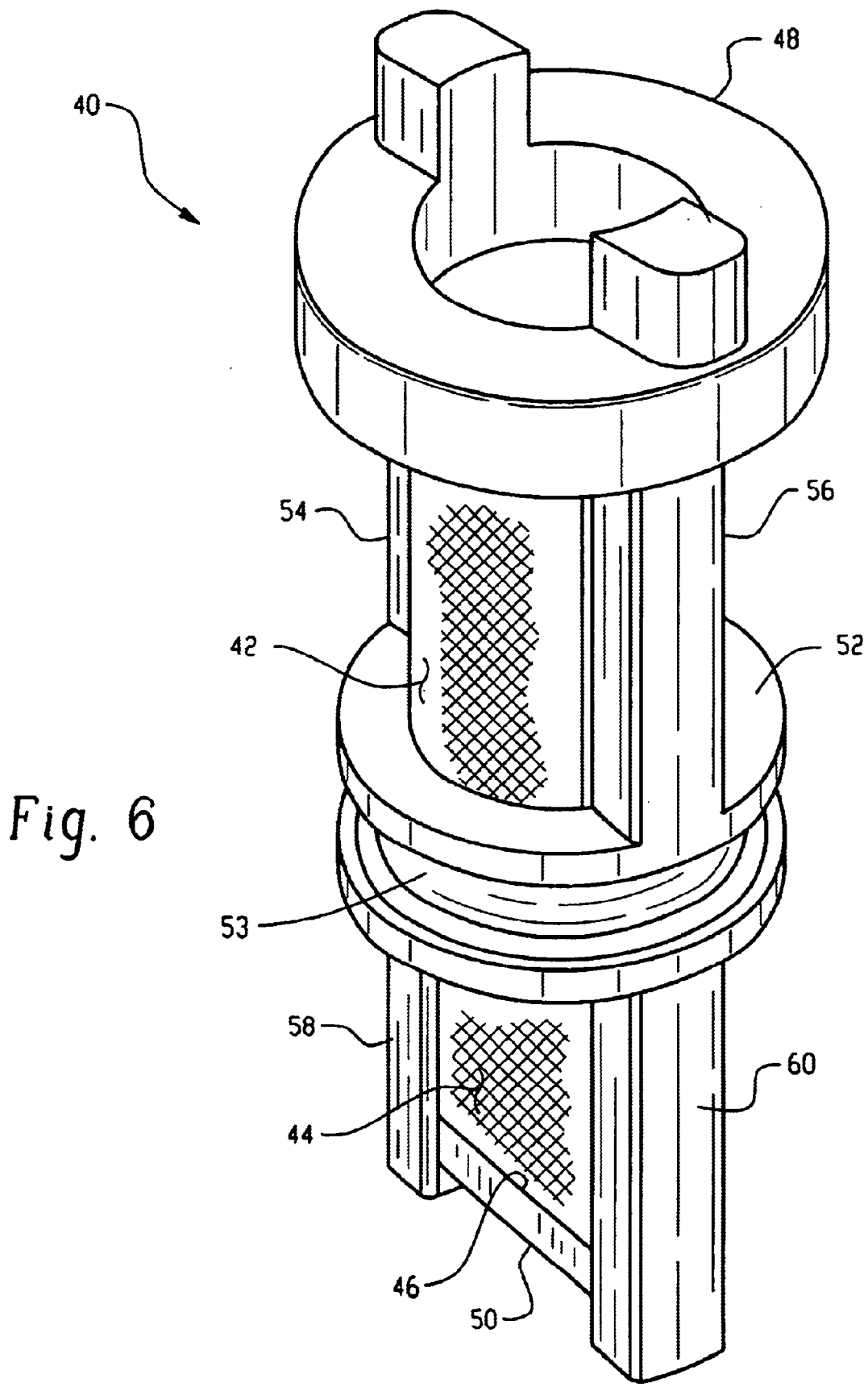

Referring to FIGS. 4, 5 and 6, an alternate embodiment of the filter cartridge is indicated generally at 40 and has a tubular generally cylindrical porous filter portion 42 preferably formed of woven screen material such as, stainless steel. Cartridge 40 has an annular tapered portion of porous filter material 44 attached to the lower end of the cylindrical portion 42; and, the tapered portion 44 is closed along the lower margin 46 thereof in a generally straight edge or linear arrangement.

The upper end of the screen portion 42 is open and has an annular rib 48 formed thereover by overmolding; and, the lower end of the tapered portion 44 has a transversely extending generally linear rib 50 formed thereon by overmolding. A second annular rib is molded over the juncture of the lower tapered screen 44 and the upper cylindrical screen 42 as denoted by reference numeral 50; and, the rib 50 has an annular groove 53 formed about the outer periphery thereof for receiving a suitable seal ring (not shown in FIGS. 4–6) therein. The annular ribs 48, 50 are interconnected by a plurality of axially extending generally linear stringers or ribs 54, 56 spaced circumferentially about the screen 42. The lower transversely extending rib 50 is interconnected with the annular rib 50 by axially extending ribs 58, 60, it being understood that all of the ribs 48, 50, 52, 54, 56, 58, 60 are preferably overmolded in a single operation by inserting the screen members 42, 44 into a mold (not shown) and molding resinous material thereover, then removing the overmolded cartridge 40 from the mold.

It will be understood that the filter 40 has a seal ring 38 received in the groove 53 prior to assembly of the filter into the passage 16 in a manner similar to the filter installation of FIGS. 1 and 2.

The present invention thus provides a low cost and simple solution to the problem of filtering flow in a fluid circuit where it is necessary to filter the fluid during a filling operation in the axial direction and to filter reverse flow in both an axial and radial direction after closure of the fill port and during system operations. The present invention provides radial and axial filtering by suitable screen material overmolded with engineered resinous material to provide a rigid filter cartridge which may be readily and easily assembled into the fill port of the fluid circuit.

Although the invention has hereinabove been described with respect to the illustrated embodiments, it will be understood that the invention is capable of modification and variation and is limited only by the following claims.

What is claimed is:

1. A removable cartridge assembly for filtering bi-directional axial flow and radial flow comprising:
    (a) a tubular member of porous filtering material having one open end and a closed end opposite said one end;
    (b) a plastic overmold on said member including (i) a first annular rib formed around the one open end and a second annular rib formed axially spaced from said first rib, and a plurality of axially extending circumferentially spaced ribs connecting said first and second ribs; and, (ii) an annular seal disposed about said second rib.

2. The cartridge assembly defined in claim 1, further comprising a third annular rib axially spaced from said first and second rib.

3. The cartridge assembly defined in claim 1, wherein said filtering material comprises screen material.

4. The cartridge assembly defined in claim 1, wherein said filtering material comprises screen material formed of stainless steel.

5. The cartridge assembly defined in claim 1, wherein said second annular rib includes an annular groove formed therein and said annular seal is received in said groove.

6. The cartridge assembly defined in claim 1, wherein closed end of said tubular member has a tapered configuration.

7. A method of making a cartridge assembly for filtering bi-directional axial flow and radial flow comprising
    (a) forming a generally tubular member of screen material and closing one end thereof with screen material and leaving open an end opposite the one end;
    (b) overmolding portions of said member with plastic material and forming a first and second axially spaced annular support rib for said tubular member and a plurality of axially extending circumferentially spaced ribs interconnecting said first and second annular rib; and,
    (c) disposing an annular resilient seal about one of said first and second ribs.

8. The method defined in claim 7, wherein said step of overmolding includes forming a third annular sealing rib intermediate said first and second annular support ribs and disposing said annular resilient seal about said third rib.

9. The method defined in claim 7, wherein said step of overmolding includes forming one of said first and second support ribs at the said one end of said cup shape and the second support rib adjacent an end opposite said one end.

10. The method defined in claim 7, wherein said step of overmolding includes forming one of said first and second annular ribs adjacent said closed end and forming a third annular rib intermediate said first and second annular ribs.

11. The method defined in claim 7, wherein said step of overmolding includes forming an annular groove in one of said annular support ribs and said step of disposing an annular sealing ring includes disposing the sealing ring in the groove.

* * * * *